United States Patent
Harasawa et al.

(10) Patent No.: US 7,264,893 B2
(45) Date of Patent: Sep. 4, 2007

(54) MAGNETIC RECORDING MEDIUM

(75) Inventors: Takeshi Harasawa, Kanagawa (JP); Hiroaki Takano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/835,184

(22) Filed: Apr. 30, 2004

(65) Prior Publication Data

US 2004/0219352 A1    Nov. 4, 2004

(30) Foreign Application Priority Data

May 2, 2003    (JP) .......................... P.2003-127198

(51) Int. Cl.
*G11B 5/66* (2006.01)
*G11B 5/70* (2006.01)

(52) U.S. Cl. .............................. 428/842.3; 428/840.6; 427/131

(58) Field of Classification Search ................ 428/328, 428/329, 336, 308.4, 694.84, 842.3, 840.6; 427/131
See application file for complete search history.

(56) References Cited

U.S. PATENT DOCUMENTS 5,766,763 A * 6/1998 Kurisu et al. ............... 428/403
6,713,149 B2 * 3/2004 Harasawa et al. .......... 428/65.3
2002/0064686 A1 * 5/2002 Araki et al. .......... 426/694 BA

FOREIGN PATENT DOCUMENTS

JP    2003-30813 A    1/2003

* cited by examiner

*Primary Examiner*—Holly Rickman
(74) *Attorney, Agent, or Firm*—Sughrue Mion, PLLC

(57) ABSTRACT

The invention provides a magnetic recording medium comprising a support having provided thereon a nonmagnetic layer containing a nonmagnetic powder, and a magnetic layer containing a ferromagnetic powder formed on the nonmagnetic layer after coating and drying thereof, wherein the ferromagnetic layer is a hexagonal ferrite powder having an average tabular diameter of 15 to 40 nm or a ferromagnetic metal powder having an average major axis length of 25 to 100 nm, the thickness of the magnetic layer is from 0.01 to 0.3 µm, the thickness of the nonmagnetic layer is from 0.5 to 5 µm, and the specific surface area and the total pore volume of the magnetic recording medium itself measured by a nitrogen absorption measured method are from 0.1 to 50 $m^2/g$ and from 0.001 to 1 ml/g, respectively, thereby being to provide the magnetic recording medium for high density recording remarkably improved in electromagnetic characteristics, particularly in high density recording characteristics.

5 Claims, No Drawings

MAGNETIC RECORDING MEDIUM

FIELD OF THE INVENTION

The present invention relates to a coating type magnetic recording medium of high recording density, and particularly to a magnetic recording medium for high density recording containing a hexagonal ferrite powder or a ferromagnetic metal powder in a magnetic layer.

BACKGROUND OF THE INVENTION

Magnetic recording media have been widely used as recording tapes, video tapes, floppy discs or the like. In general, a magnetic recording medium is constituted by laminating a magnetic layer on a support, and laminating a back layer on the side thereof opposite to the magnetic layer as needed for a tape-shaped medium. For a disk-shaped medium, magnetic layers are laminated on both sides of a support.

Then, a magnetic layer of a coating type magnetic recording medium is generally formed by applying onto a support a dispersion of a ferromagnetic powder in a binder to which a lubricant and an abrasive, and carbon as needed, are added.

In recent years, in order to increase the output of a magnetic layer, it has been proposed to reduce the thickness of the magnetic layer. For this purpose, a magnetic recording medium in which an intermediate layer is provided between a support and a magnetic layer has been proposed.

Further, in a vapor deposition type magnetic recording medium, a magnetic film is formed on a support by vacuum deposition. A metal or alloy mainly comprising cobalt is vapor deposited as a magnetic substance in an atmosphere of oxygen, and a protective film and a lubricant film are formed on the magnetic film as needed.

With respect to the magnetic recording medium thus obtained, an audio tape for music recording and reproduction is required to have higher ability to reproduce an original sound, a video tape is required to be excellent in ability to reproduce an original image, and a backup tape or disc for computers is required to be excellent in storage stability, to be satisfactory in durability and to cause no data loss.

In order to allow the magnetic recording medium to have excellent electromagnetic characteristics and to ensure durability so as to meet various requirements as described above, heightening the Hc of magnetic substances, increasing orientation, thinning coated layers, developments of protective layers for magnetic layers, and developments of lubricants for reducing the coefficient of friction of magnetic layers/back layers have been conducted.

On the other hand, on the side of recording and reproduction apparatus, recording wavelengths are being shortened and tracks of magnetic recording heads are being narrowed as means for increasing recording capacity per unit area.

Further, magnetic heads which work with electromagnetic induction as the principle of operation (induction type magnetic heads) come to have a limitation in the use thereof in a higher density recording and reproduction region. That is to say, in order to obtain large reproduction output, it is necessary to increase the turns of a coil of a reproduction head. However, the inductance increases, and the resistance at high frequency increases, resulting in a reduction in reproduction output.

In recent years, reproduction heads which work with MR (magneto-resistance) as the principle of operation have been proposed and have come to be used in hard discs, etc. In the MR head, reproduction output of several times that of the induction type magnetic head is obtained, and no induction coil is used, so that instrument noises such as impedance noises are extremely reduced. It has become therefore possible to obtain a high S/N ratio by decreasing noises of a magnetic recording medium. In other words, when the magnetic recording medium noises which have hitherto been hidden behind the instrument noises are decreased, good recording and reproduction can be performed, thereby being able to drastically improve high density recording characteristics.

In the meantime, in order to provide a magnetic recording medium for high density recording remarkably improved in electromagnetic characteristics, particularly in high density recording characteristics, JP-A-2003-30813 has proposed a magnetic recording medium comprising a support having provided thereon a magnetic layer mainly containing a ferromagnetic powder and a binder, wherein the ferromagnetic layer is a hexagonal ferrite powder having an average tabular diameter of 15 to 40 nm, the perpendicular factor of the squareness ratio SQ of the magnetic layer is from 0.1 to 0.55, the specific surface area and the total pore volume of the magnetic recording medium itself measured by a nitrogen absorption method are from 0.1 to 50 $m^2/g$ and from 0.001 to 1 ml/g, respectively, and the magnetic layer thickness is 0.02 to 0.3 µm.

However, the thickness of the magnetic layers described in the examples of JP-A-30813 is as thick as 0.2 µm. In such thick magnetic layers, the problem has been encountered that the dispersibility of the ferromagnetic powders is deteriorated to cause the generation of aggregates, thereby increasing noises. (the term "JP-A" as used herein means an "unexamined published Japanese patent application")

SUMMARY OF THE INVENTION

An object of the invention is to provide a magnetic recording medium for high density recording improved in S/N ratio.

According to the invention, there is provided a magnetic recording medium comprising a support having provided thereon a nonmagnetic layer containing a nonmagnetic powder, and a magnetic layer containing a ferromagnetic powder formed on the nonmagnetic layer after coating and drying thereof, wherein the ferromagnetic layer is a hexagonal ferrite powder having an average tabular diameter of 15 to 40 nm or a ferromagnetic metal powder having an average major axis length of 25 to 100 nm, the thickness of the magnetic layer is from 0.01 to 0.3 µm, the thickness of the nonmagnetic layer is from 0.5 to 5 µm, and the specific surface area and the total pore volume of the magnetic recording medium itself measured by a nitrogen absorption method are from 0.1 to 50 $m^2/g$ and from 0.001 to 1 ml/g, respectively.

Preferred embodiments of the invention are as follows:

(1) The above-mentioned magnetic recording medium which is used for MR head reproduction; and (2) The above-mentioned magnetic recording medium which is a magnetic tape having a squareness ratio of 0.7 or more.

DETAILED DESCRIPTION OF THE INVENTION

The present inventors have discovered that a magnetic recording medium remarkably improved in S/N ratio in a high density recording area, which has not been able to be obtained by conventional techniques, is obtained by the above-mentioned constitution.

That is to say, the invention is intended to allow ensuring of magnetic characteristics to be compatible with improvement in the dispersibility of a ferromagnetic powder. In the invention, a hexagonal ferrite powder having an average tabular diameter of 15 to 40 nm, preferably 20 to 30 nm, or a ferromagnetic metal powder having an average major axis length of 25 to 100 nm, preferably 30 to 50 nm, is used. A magnetic layer is formed to a thickness of 0.01 to 0.3 μm, preferably 0.05 to 0.15 μm, and a nonmagnetic layer is formed to a thickness of 0.5 to 5 μm, preferably 1 to 2 μm, by a wet-on-dry process. At the same time, the specific surface area and the total pore volume of the magnetic recording medium itself measured by a nitrogen absorption method are adjusted to 0.1 to 50 $m^2/g$, preferably 5 to 10 $m^2/g$, and 0.001 to 1 ml/g, preferably 0.01 to 0.1 ml/g, respectively. The S/N ratio of the magnetic recording medium is improved by this constitution.

In the invention, the magnetic layer is formed after coating and drying of the relatively thick nonmagnetic layer, so that a solvent of a coating solution for the magnetic layer is rapidly absorbed by the nonmagnetic layer. Accordingly, the magnetic layer is rapidly dried. It is therefore considered that the dispersibility of the ferromagnetic powder is maintained to inhibit the formation of aggregates, resulting in improvement in S/N ratio as well. The specific surface area and the total pore volume measured by the nitrogen absorption method are largely contributed in the nonmagnetic layer. The contribution in the nonmagnetic layer accounts for preferably 60% or more of the whole magnetic recording medium, more preferably 90% or more thereof.

Although there is no particular limitation on the means for controlling the specific surface area and the total pore volume, it is preferred to adjust the amount of carbon black added to the nonmagnetic layer.

The specific surface area and the total pore volume of the magnetic recording medium itself measured by the nitrogen absorption method are values measured by the following method.

The values are measured by the nitrogen absorption method using a measuring apparatus, Auto-Sorb 1, manufactured by US QUANTA CHROME Co. Auto-Sorb 1 measures pores by the BJH method, and measures the volume and specific surface area thereof to determine the specific surface area and the total pore volume. As a measuring procedure at this time, a sample is deaerated for 5 hours or more, and then, the measurement is performed with Auto-Sorb 1 at the temperature of liquid nitrogen. Further, after the measurement, the magnetic layer is peeled off from the sample. Then, the magnetic layer is deaerated, and the weight is measured. The above-mentioned specific surface area and total pore volume are each divided by the weight to give the specific surface area and total pore volume per weight of the magnetic layer.

The magnetic recording medium of the invention will be described in detail below.

[Magnetic Layer]

In the magnetic recording medium of the invention, the magnetic layer containing the ferromagnetic powder may be provided on either one side or both sides of the support.

The magnetic layer provided on the one side may be either a monolayer or a plurality of layers different each other in composition. Further, in the invention, the nonmagnetic layer (also referred to as a lower layer) is provided between the support and the magnetic layer. The magnetic layer is also referred to as an upper layer or an upper magnetic layer.

The upper layer is formed by the wet-on-dry (W/D) method in which the upper layer is provided after drying of the lower layer.

[Ferromagnetic Powder]

As the ferromagnetic powder used in the magnetic layer, there is used a ferromagnetic metal powder or a hexagonal ferrite powder.

(Ferromagnetic Metal Powder)

The ferromagnetic metal powder is preferably one containing Fe as a main component and Al, Y, Co, Ni, Mn, Zn, Nd, etc. as alloy components. In particular, an Fe—Co alloy is known as a material which can provide high coercive force Hc.

The average major axis length of the ferromagnetic metal powder is from 25 to 100 nm, and preferably from 30 to 70 nm. The average aspect ratio (the arithmetic average of {major axis length/minor axis length}) is preferably from 3 to 8, and more preferably from 4 to 7.

When the particle size of the ferromagnetic metal powder is larger than the above, noises increase. On the other hand, when it is smaller than the above, the effect of the invention is not achieved. It is considered that a method more devised than this method is required for such an ultrafine particles.

The saturation magnetization $\sigma_s$ of the ferromagnetic metal powder is usually from 80 to 140 $A \cdot m^2/kg$, and preferably from 90 to 130 $A \cdot m^2/kg$, and the coercive force Hc is usually from 120 to 360 kA/m, and preferably from 158 to 350 kA/m.

(Hexagonal Ferrite Powder)

Examples of the hexagonal ferrites include barium ferrite, strontium ferrite, lead ferrite, calcium ferrite and a substituted product thereof with Co etc. Specific examples thereof include magnetoplumbite type barium ferrite and strontium ferrite, magnetoplumbite type ferrite whose particle surfaces are covered with spinel, and magnetoplumbite type barium ferrite and strontium ferrite partially containing a spinel phase. The hexagonal ferrites may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb, in addition to specified atoms. In general, the hexagonal ferrites containing atoms such as Co—Zn, Co—Ti, Co—Ti—Zr, Co—Ti—Zn, Ni—Ti—Zn, Nb—Zn—Co, Sb—Zn—Co and Nb—Zn can be used. According to the starting material and the production method, some contain specific impurities.

The average tabular diameter of the hexagonal ferrite powder used in the invention is from 15 to 40 nm. The tabular diameter as used herein means the longest hexagonal diameter of the base of a hexagonal pole of a hexagonal ferrite magnetic powder, and the average tabular diameter is the arithmetic average thereof.

In particular, when reproduction is performed with a magnetoresistive head in order to increase track density, noises are required to be decreased. Accordingly, the tabular diameter is preferably 30 nm or less. However, smaller than 15 nm results in failure to expect stable magnetization because of thermal fluctuation, whereas exceeding 40 nm results in increased noises. Thus, both are unsuitable for high density magnetic recording. The average tabular ratio {the arithmetic average of (tabular diameter/tabular thickness)} is preferably from 1 to 5, and more preferably from 1 to 3. When the average tabular ratio is small, filling properties in the magnetic layer are preferably enhanced, but sufficient orientation is not obtained. Higher than 15 results in increased noises caused by stacking among particles. The specific surface area ($S_{BET}$) measured by the BET method within this particle size range shows 30 to 200 m$^2$/g. The specific surface area nearly coincides with a value arithmetically calculated from tabular diameter and tabular thickness. The narrower distribution of particle tabular diameter/tabular thickness is generally preferred. The distributions in numerical values can be compared by randomly measuring 500 particles from TEM photographs of particles. The distribution is not a normal distribution in many cases. However, when expressed by the standard deviation to the average size by calculation, the σ/average size is from 0.1 to 2.0. In order to sharpen the particle size distribution, a particle formation reaction system is homogenized as much as possible, and the particles formed are also subjected to distribution—improving treatment. For example, a method of selectively dissolving ultrafine particles in an acid solution is also known. The coercive force Hc measured in a magnetic substance can be produced to about 500 to about 5,000 Oe (40 to 400 kA/m). Although the higher Hc is advantageous for high density recording, it is restricted by the capacity of a recording head. The Hc can be controlled by the particle size (tabular diameter/tabular thickness), the kind and amount of element contained, the substitution site of element, the conditions of particle formation reaction, etc. The saturation magnetization $\sigma_s$ is from 30 to 80 A·m$^2$/kg. Finer particles tend to result in smaller saturation magnetization. Production methods include a method of reducing the crystallization temperature or the heat treatment temperature and time, and a method of increasing the amount of a compound to be added or the amount of surface treatment. Further, it is also possible to use a W-type hexagonal ferrite. When the magnetic substance is dispersed, particle surfaces of the magnetic substance are also treated with a material compatible with a dispersing medium and a polymer. An inorganic compound or an organic compound is used as a surface treating agent. Typical examples thereof include oxides or hydroxides of Si, Al, P, etc., various silane coupling agents and various titanium coupling agents. They are added in an amount of 0.1 to 10% based on the magnetic substance. The pH of the magnetic substance is also important for dispersion. It is usually from about 4 to about 12, and has an optimum value depending on the dispersing medium and the polymer. From the chemical stability and storage stability of the medium, a pH of about 6 to about 11 is selected. The water content in the magnetic substance has an effect on dispersion. Although it has an optimum value depending on the dispersing medium and the polymer, a water content of 0.01 to 2.0% is usually selected. Methods for producing the hexagonal ferrites include (1) a glass crystallization method of mixing a metal oxide which substitutes barium oxide/iron oxide/iron, with boron oxide as a glass-forming material so as to give a desired ferrite composition, followed by melting and rapid cooling to form an amorphous substance, reheating the amorphous substance, and then, washing and pulverizing the resulting product to obtain a barium ferrite crystalline powder, (2) a hydrothermal reaction method of neutralizing a solution of a metal salt of a barium ferrite composition with an alkali, removing by-products, heating a liquid phase at a temperature of 100° C. or more, followed by washing, drying and pulverizing to obtain a barium ferrite crystalline powder, and (3) a co-precipitation method of neutralizing a solution of a metal salt of a barium ferrite composition with an alkali, removing by-products, followed by drying and treating at a temperature of 1,100° C. or less, and pulverizing the resulting product to obtain a barium ferrite crystalline powder. However, any production methods can be used in the invention.

[Lower Layer]

The lower layer will be described in detail below. The lower layer preferably contains a nonmagnetic inorganic powder and a binder as main components. The nonmagnetic inorganic powder used in the lower layer can be selected from inorganic compounds such as a metal oxide, a metal carbonate, a metal sulfate, a metal nitride, a metal carbide and a metal sulfide. The inorganic compounds include, for example, α-alumina having an α-conversion rate of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. They may be use either alone or in combination. Particularly preferred are titanium dioxide, zinc oxide, iron oxide and barium sulfate because of their small particle size distribution and many means for imparting functions, and more preferred are titanium dioxide and α-iron oxide. It is preferred that these nonmagnetic inorganic powders have an average particle size of 0.005 to 2 μm. However, the plurality of nonmagnetic inorganic powders different in average particle size may be combined as needed, or even in the case of the single nonmagnetic inorganic powder, the particle size distribution can be widened to give the same effect. Particularly preferred the nonmagnetic inorganic powders have an average particle size of 0.01 to 0.2 μm. In particular, when the nonmagnetic inorganic powder is a granular metal oxide, the average particle size thereof is preferably 0.08 μm or less, and when the nonmagnetic inorganic powder is an acicular metal oxide, the average major axis length is preferably 0.3 μm or less, and more preferably 0.2 μm or less. The tap density is usually from 0.05 to 2 g/ml, and preferably from 0.2 to 1.5 g/ml. The water content of the nonmagnetic inorganic powder is usually from 0.1 to 5% by weight, preferably from 0.2 to 3% by weight, and more preferably from 0.3 to 1.5% by weight. The pH of the nonmagnetic inorganic powder is usually from 2 to 11, preferably between 5.5 and 10, and more preferably between 3 and 6. The specific surface area ($S_{BET}$) of the nonmagnetic inorganic powder is usually from 1 to 100 m$^2$/g, preferably from 5 to 80 m$^2$/g, and more preferably from 10 to 70 m$^2$/g. The crystallite size of the nonmagnetic inorganic powder is preferably from 0.004 to 1 μm, and more preferably from 0.04 to 0.1 μm. The oil absorption using DBP (dibutyl phthalate) is usually from 5 to 100 ml/100 g, preferably from 10 to 80 ml/100 g, and more preferably from 20 to 60 ml/100 g. The specific gravity is usually from 1 to 12, and preferably from 3 to 6. The shape may be any of an acicular, spherical, polyhedral and tabular shapes. The Mohs' hardness is preferably from 4 to 10. The SA (stearic acid) adsorption of the nonmagnetic inorganic powder is from 1 to 20 μmol/m$^2$, preferably from 2 to 15 μmol/m$^2$, and more preferably from 3 to 8 μmol/m$^2$. It is preferred that $Al_2O_3$, $SiO_2$, $TiO_2$, $ZrO_2$, $SnO_2$, $Sb_2O_3$, ZnO or $Y_2O_3$ exists on surfaces of these nonmagnetic inorganic powders by surface treatment. In particular, $Al_2O_3$, $SiO_2$, $TiO_2$ and $ZrO_2$ are preferred for dispersibility, and more preferred are $Al_2O_3$, $SiO_2$ and $ZrO_2$. They may be used in combination, and can also be used alone. Further, a surface treatment layer formed by coprecipitation may be used depending on the purpose. Alternatively, there can be also be employed a method of allowing alumina to exist in the first place, and then allowing silica to exist thereon, or the reverse method thereof. Further, the surface treatment layer may be a porous layer depending on the purpose. However, it is generally preferred that the layer is homogeneous and dense.

Specific examples of the nonmagnetic powders used in the lower layer include Nanotite manufactured by Showa Denko Co., Ltd., HIT-100 and ZA-G1 manufactured by Sumitomo Chemical Co., Ltd., α-hematite DPN-250, DPN-250BX, DPN-245, DPN-270BX, DPN-500BX, DBN-SA1 and DBN-SA3manufactured by Toda Kogyo Corp., titanium oxide TTO-51B, TTO-55A, TTO-55B, TTO-55C, TTO-55S, TTO-55D, SN-100, α-hematite E270, E271, E300 and E303 manufactured by Ishihara Sangyo Kaisha Ltd., titanium oxide STT-4D, STT-30D, STT-30, STT-65C and α-hematite α-40 manufactured by Titan Kogyo Co., Ltd., MT-100S, MT-100T, MT-150W, MT-500B, MT-600B, MT-100F and MT-500HD manufactured by Tayca Corporation, FINEX-25, BF-1, BF-10, BF-20 and ST-M manufactured by Sakai Chemical Industry Co., Ltd., DEFIC-Y and DEFIC-R manufactured by Dowa Mining Co., Ltd., AS2BM and TiO2 P25 manufactured by Nippon Aerosil Co., Ltd., 100A and 500A manufactured by Ube Industries Ltd., and calcined products thereof. Particularly preferred examples of the nonmagnetic powders are titanium dioxide and α-iron oxide.

Addition of a carbon black to the lower layer can decrease the surface electrical resistance (Rs) and the light transmittance, which is the known effect other than the adjustment of the above-mentioned specific surface area and total pore volume. At the same time, a desired micro Vickers' hardness can be obtained. Further, it is also possible to bring about the effect of lubricant storage by addition of the carbon black to the lower layer. The carbon blacks usable herein include furnace black for rubber, thermal black for rubber, coloring black and acetylene black. The carbon black contained in the lower layer should be optimized in the following characteristics according to desired effects. The combined use of the carbon blacks brings about more enhanced effects in some cases.

The specific surface area ($S_{BET}$) of the carbon black in the lower layer is usually from 100 to 500 $m^2/g$, and preferably from 150 to 400 $m^2/g$, and the DBP oil absorption is from 20 to 400 ml/100 g, and preferably from 30 to 400 ml/100 g. The average particle size of the carbon black is usually from 5 to 80 nm, preferably from 10 to 50 nm, and more preferably from 10 to 40 nm. The carbon black having an average particle size of larger than 80 nm may be contained in small amounts. The pH of the carbon black is preferably from 2 to 10, the water content is preferably from 0.1 to 10%, and the tap density is preferably from 0.1 to 1 g/ml. Specific examples of the carbon blacks used in the invention include BLACKPEARLS 2000, 1300, 1000, 900, 800, 880 and 700, and VULCAN XC-72 manufactured by Cabot Corporation, #3050B, #3150B, #3250B, #3750B, #3950B, #950, #650B, #970B, #850B, Ma-600, MA-230, #4000 and #4010 manufactured by Mitsubishi Kasei Corp., CONDUCTEX SC, RAVEN 8800, 8000, 7000, 5750, 5250, 3500, 2100, 2000, 1800, 1500, 1255 and 1250 manufactured by Columbian Carbon. Company, and Ketjen Black EC manufactured by Akzo Corp. The carbon black may be surface treated with a dispersing agent, or grafted with a resin before use. Further, the surface thereof maybe partly graphitized before use. The carbon black may be previously dispersed with a binder before addition of the carbon black to a coating.

These carbon blacks are used preferably in an amount of 5 to 100% by weight, more preferably in an amount of 10 to 30% by weight, based on the above-mentioned nonmagnetic inorganic powder (containing no carbon black). Further, it is preferred to use the carbon blacks within the range not exceeding 45% of the total weight of the nonmagnetic layer. These carbon blacks can be used either alone or in combination. For the carbon blacks usable in the invention, reference can be made to, for example, *Carbon Black Binran* (Handbook of Carbon Blacks) (edited by Carbon Black Association).

Further, an organic powder can also be added to the lower layer depending on the purpose. The organic powders include, for example, an acrylic-styrene resin, a benzoguanamine resin powder, a melamine resin powder and a phthalocyanine pigment. However, a polyolefinic resin powder, a polyester resin powder, a polyamide resin powder, a polyimide resin powder and a polyethylene fluoride resin powder can also be used. Methods for producing them are described in JP-A-62-18564 and JP-A-60-255827.

Binder resins, lubricants, dispersing agents, additives, solvents, dispersing methods and others for the magnetic layer described below are applicable to the lower layer or a back layer described later. In particular, with respect to the amount and kind of binder resin, the additive, and the amount and kind of dispersing agent, well-known techniques relating to the magnetic layer are applicable.

[Binder]

As the binder used in the invention, there is used a thermoplastic resin, a thermosetting resin, a reactive resin or a mixture thereof which has hitherto been known.

The thermoplastic resin is a resin having a glass transition temperature of –100 to 150° C., a number average molecular weight of 1,000 to 200,000, preferably 10,000 to 100,000, and a polymerization degree of about 50 to about 1,000.

Examples of such thermoplastic resins include a polymer and a copolymer containing vinyl chloride, vinyl acetate, vinyl alcohol, maleic acid, acrylic acid, an acrylate, vinylidene chloride, acrylonitrile, methacrylic acid, a methacrylate, styrene, butadiene, ethylene, vinyl butyral, vinyl acetal, vinyl ether or the like as a constituent unit, a polyurethane resin and various rubber resins. Further, the thermosetting resins and the reactive resins include a phenolic resin, an epoxy resin, a curable type polyurethane resin, a urea resin, a melamine resin, an alkyd resin, an acrylic reactive resin, a formaldehyde resin, a silicone resin, an epoxy-polyamide resin, a mixture of a polyester resin and an isocyanate prepolymer, a mixture of a polyesterpolyol and a polyisocyanate, and a mixture of a polyurethane and a polyisocyanate. These resins are described in detail in *Plastic Handbook*, Asakura Shoten. Further, it is also possible to use a known electron beam-curable type resin in each layer. Examples thereof and methods for producing the same are described in detail in JP-A-62-256219. Although the above-mentioned resins can be used either alone or in combination, preferred examples thereof include a combination of a polyurethane resin and at least one selected from a vinyl chloride resin, a vinyl chloride-vinyl acetate copolymer, a vinyl chloride-vinyl acetate-vinyl alcohol copolymer and a vinyl chloride-vinyl acetate-maleic anhydride copolymer, and a combination of any of these resins and a polyisocyanate.

As the polyurethane resin, there can be used a polyurethane resin known in the art such as a polyester polyurethane, a polyether polyurethane, a polyether polyester polyurethane, a polycarbonate polyurethane, a polyester polycarbonate polyurethane or a polycaprolactone polyurethane. In order to obtain more excellent dispersibility and durability for all binders shown herein, it is preferred that at least on polar group selected from —COOM, —SO$_3$M, —OSO$_3$M, —P=O(OM)$_2$, —O—P=O(OM)$_2$ (wherein M represents a hydrogen atom or an alkali metal salt group), —NR$_2$, —N$^+$R$_3$ (wherein R represents a hydrocarbon group), an epoxy group, —SH, —CN, etc. is introduced by copolymerization or addition reaction as needed. The amount of such a polar group is from $10^{-1}$ to $10^{-8}$ mol/g, and preferably from $10^{-2}$ to $10^{-6}$ mol/g. Further, it is preferred that a polyurethane molecule has at least one OH group at each end thereof, two or more OH groups in total, in addition to these polar groups. The OH groups are crosslinked with the polyisocyanate, a curing agent, to form a three-dimensional network structure. Accordingly, it is preferred that more OH groups are contained in the molecule. In particular, the OH group is preferably positioned at an end of the molecule because of its high reactivity with the curing agent. It is therefore preferred that the polyurethane has 3 or more OH groups, particularly preferably 4 or more OH groups, at ends of the molecule. When the polyurethane is used in the invention, the glass transition temperature is usually from −50 to 150° C., preferably from 0 to 100° C., and particularly preferably from 30 to 100° C., the breaking elongation is from 100 to 2,000%, the breaking stress is usually from 0.05 to 10 Kg/mm$^2$ (0.49 to 98 MPa), and the yielding point is preferably from 0.05 to 10 Kg/mm$^2$ (0.49 to 98 MPa). The polyurethane having such physical properties forms a coating film having good mechanical characteristics.

Specific examples of the binders used in the invention include VAGH, VYHH, VMCH, VAGF, VAGD, VROH, VYES, VYNC, VMCC, XYHL, XYSG, PKHH, PKHJ, PKHC and PKFE manufactured by Union Carbide Corporation, MPR-TA, MPR-TA5, MPR-TAL, MPR-TSN, MPR-TMF, MPR-TS, MPR-TM and MPR-TAO manufactured by Nissin Chemical Industry Co., Ltd., 1000W, DX80, DX81, DX82, DX83 and 100FD manufactured by Denki Kagaku Kogyo K. K., and MR-104, MR-105, MR-110, MR-100, MR-555 and 400X-110A manufactured by Nippon Zeon Co., Ltd., as vinyl chloride copolymers; and Nippollan N2301, N2302 and N2304 manufactured by Nippon Polyurethane Industry Co., Ltd., Pandex T-5105, T-R3080 and T-5201, Burnock D-400 and D-210-80, and Crisvon 6109 and 7209 manufactured by Dainippon Ink & Chemicals, Inc., Vylon UR8200, UR8300, UR8700, RV530 and RV280 manufactured by Toyobo Co., Ltd., Daipheramine 4020, 5020, 5100, 5300, 9020, 9022 and 7020, polycarbonate polyurethanes manufactured by Dainichiseika Color & Chemicals Mfg. Co., Ltd., MX5004, a polyurethane manufactured by Mitsubishi Kasei Corp., Sunprene SP-150, a polyurethane manufactured by Sanyo Chemical Industries Co., Ltd., and Saran F310 and F210, polyurethanes manufactured by Asahi Chemical Industry Co., Ltd., as polyurethane resins.

The binder used in the nonmagnetic layer or the magnetic layer is used in an amount ranging from 5 to 50% by weight, preferably from 10 to 30% by weight, based on the nonmagnetic inorganic powder or the hexagonal ferrite powder. When the vinyl chloride resin is used, it is preferably used in an amount of 5 to 30% by weight, and when the polyurethane resin is used, it is preferably used in an amount of 2 to 20% by weight. The polyisocyanate is preferably used in an amount of 2 to 20% by weight. These resins are preferably used in combination. However, for example, when head corrosion occurs by a trace amount of chlorine generated by dechlorination, it is also possible to use only the polyurethane or only the polyurethane and the polyisocyanate.

The magnetic recording medium of the invention can comprise two or more layers. It is therefore possible, of course, to vary the amount of the binder, the amount of the vinyl chloride resin, the polyurethane resin, the polyisocyanate or other resins contained in the binder, the molecular weight of each resin forming the magnetic layer, the amount of the polar groups or the physical characteristics of the resins described above, in each layer as needed. They should be rather optimized in each layer. Techniques known in the art with respect to multiple magnetic layers can be applied. For example, when the amount of the binder is varied in each layer, it is effective to increase the amount of the binder in the magnetic layer for decreasing scratches on a surface of the magnetic layer. In order to improve head touch to a head, the amount of the binder in the nonmagnetic layer can be increased to give flexibility.

The polyisocyanates used in the invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyante; reaction products of these isocyanates with polyalcohols; and polyisocyanates formed by condensation of isocyanates. These isocyanates are commercially available under the trade names of Coronate L, Coronate HL, Coronate 2030, Coronate 2031, Millionate MR and Millionate MTL manufactured by Nippon Polyurethane Industry Co., Ltd.; Takenate D-102, Takenate D-110N, Takenate D-200 and Takenate D-202 manufactured by Takeda Chemical Industries, Ltd.; and Desmodur L, Desmodur IL, Desmodur N and Desmodur HL manufactured by Sumitomo Bayer Co., Ltd. They can be used either alone or as a combination of two or more of them, utilizing the difference in curing reactivity, in each layer.

[Carbon Black and Abrasive]

As the carbon black used in the magnetic layer of the invention, there can be used furnace black for rubber, thermal black for rubber, coloring black or acetylene black. Preferably, the carbon black has a specific surface area ($S_{BET}$) of 5 to 500 m$^2$/g, a DBP oil absorption of 10 to 400 ml/100 g, an average particle size of 5 to 300 nm, a pH of 2 to 10, a water content of 0.1 to 10% and a tap density of 0.1 to 1 g/ml. Specific examples of the carbon blacks used in the invention include BLACKPEARLS 2000, 1300, 1000, 900, 905, 800 and 700, and VULCAN XC-72 manufactured by Cabot Corporation; #80, #60, #55, #50 and #35 manufactured by Asahi Carbon Co., Ltd.; #2400B, #2300, #900, #1000, #30, #40 and #10B manufactured by Mitsubishi Kasei Corp.; CONDUCTEX SC, RAVEN 150, 50, 40, 15 and RAVEN-MT-P manufactured by Columbian Carbon Company; and Ketjen Black EC manufactured by Nippon EC. The carbon black may be surface treated with a dispersing agent, or grafted with a resin before use. Further, the surface thereof may be partly graphitized before use. The carbon black may be previously dispersed with a binder before addition of the carbon black to a magnetic coating. These carbon blacks can be used alone or in combination. The carbon black is preferably used in an amount of 0.1 to 30% based on the magnetic substance. The carbon black serves to provide antistatic properties to the magnetic layer, to reduce the coefficient of friction thereof, to give shading properties thereto, and to improve film strength thereof. These vary according to the kind of carbon black used. It is therefore possible, of course, that the carbon black is properly used in the upper magnetic layer and the lower nonmagnetic layer by changing the kind, amount and combination of the carbon black, based on the various characteristics described above such as the particle size, oil absorption, electric conductivity and pH, depending on the purpose.

They should be rather optimized in each layer. For the carbon black which can be used in the magnetic layer of the invention, reference can be made to, for example, *Carbon Black Binran* (Handbook of Carbon Blacks) edited by Carbon Black Association and WO98/35345.

In the invention, it is preferred to use an abrasive in the magnetic layer. The abrasives include known materials having a Mohs' hardness of 6 or more such as α-alumina having an α-conversion rate of 90% or more, β-alumina, diamond, silicon carbide, chromium oxide, cerium oxide, α-iron oxide, corundum, silicon nitride, titanium carbide, titanium oxide, silicon dioxide and boron nitride. They are used either alone or in combination. Further, a composite material composed of these abrasives (obtained by surface treating an abrasive with another abrasive) may be used. In some cases, these abrasives may contain some compounds or elements other than the main components. However, the effect is unchanged as long as the main components are contained in an amount of 90% or more. The particle size of these abrasives is preferably from 0.01 to 2 μm. In particular, in order to improve electromagnetic characteristics, the narrower particle size distribution thereof is preferred. Further, in order to improve durability, it is also possible to combine the abrasives different in particle size as needed, or to widen the particle size distribution even in the case of the single abrasive to give the same effect. It is preferred that the abrasive has a tap density of 0.3 to 2 g/ml, a water content of 0.1 to 5%, a pH of 2 to 11 and a specific surface area of 1 to 30 $m^2/g$. The shape of the abrasive used in the invention may be any of acicular, spherical and die-like forms. However, a shape partly having an edge is preferred because of high abrasive quality. Specific examples thereof include AKP-12, AKP-15, AKP-20, AKP-30, AKP-50, HIT-20, HIT-30, HIT-55, HIT-60, HIT-70, HIT-80 and HIT-100 manufactured by Sumitomo Chemical Co., Ltd.; ERC-DMB, HP-DBM and HPS-DBM manufactured by Reynolds Inc., WA10000 manufactured by Fujimi Kenmazai Co., Ltd.; UB20 manufactured by C. Uyemura & Co., Ltd.; G-5, Kromex U2 and Kromex U1 manufactured by Nippon Chemical Industrial Co., Ltd.; TF100 and TF140 manufactured by Toda Kogyo Co., Ltd.; Beta Random Ultrafine manufactured by Ibiden Co., Ltd.; and B-3 manufactured by Showa Mining Co., Ltd. Each of these abrasives can also be added to the nonmagnetic layer as needed. Addition thereof to the nonmagnetic layer can control the surface shape and the state of the abrasive projected. The particle size and amount of the abrasive added to the magnetic layer or the nonmagnetic layer should be established, of course, to optimum values.

[Additives]

In the invention, additives having a lubricating effect, an antistatic effect, a dispersing effect or a plasticizing effect are used in the magnetic layer, or further in the nonmagnetic layer, and the performance can be comprehensively improved by a combination thereof. As the additives having the lubricating effect, there are used lubricants showing the action of significantly reducing adhesion generated at the time when surfaces of materials are rubbed with each other. The lubricants are classified into two types. It can not be judged whether the lubricants used in the magnetic recording medium completely show fluid lubrication or boundary lubrication. However, when classified according to a general concept, the lubricants are classified into a higher fatty acid ester, fluid paraffin, a silicon derivative, etc. which show fluid lubrication, and along-chain fatty acid, a fluorine surfactant, a fluorine-containing polymer, etc. which show boundary lubrication. In a coating type medium, the lubricant exists in a state in which it is dissolved in the binder, or in a state in which it is partly adsorbed by surfaces of the ferromagnetic powder particles. Although the lubricant migrates to a surface of the magnetic layer, the rate of migration thereof depends on whether compatibility between the binder and the lubricant is good or bad. When the compatibility between the binder and the lubricant is good, the rate of migration is low, and when the compatibility is bad, the rate of migration is high. As one idea on whether the compatibility is good or bad, the solubility parameters of both are compared with each other. A nonpolar lubricant is effective for fluid lubrication, and a polar lubricant is effective for boundary lubrication.

In the invention, it is preferred that the higher fatty acid ester showing fluid lubrication and the long-chain fatty acid showing boundary lubrication, which are different in characteristics, are combined with each other. It is more preferred that at least three kinds of lubricants are combined with one another. A solid lubricant can also be used in combination therewith.

As the solid lubricants, there are used, for example, molybdenum disulfide, tungsten graphite disulfide, born nitride and graphite fluoride. Examples of the long-chain fatty acids showing boundary lubrication include a monobasic fatty acid having 10 to 24 carbon atoms (which may contain an unsaturated bond or may be branched) and a metal salt (such as a Li salt, a Na salt, a K salt or a Cu salt) thereof. The fluorine surfactants and the fluorine-containing polymers include a fluorine-containing silicone, a fluorine-containing alcohol, a fluorine-containing ester, a fluorine-containing alkylsulfate and an alkali metal salt thereof. The higher fatty acid esters showing fluid lubrication include a mono-, di- or tri-fatty acid ester of a monobasic fatty acid having 12 to 22 carbon atoms (which may contain an unsaturated bond or may be branched) with a monohydric, dihydric, trihydric, tetrahydric, pentahydric or hexahydric alcohol having 2 to 12 carbon atoms (which may contain an unsaturated bond or may be branched), and a fatty acid ester of a monoalkyl ether of an alkylene oxide polymer. The higher fatty acid esters further include fluid paraffin. The silicon derivatives include a silicone oil such as a dialkylpolysiloxane (alkyl has 1 to 5 carbon atoms), a dialkoxypolysiloxane (alkoxy has 1 to 4 carbon atoms), a monoalkylmonoalkoxypolysiloxane (alkyl has 1 to 5 carbon atoms, and alkoxy has 1 to 4 carbon atoms), a phenyl-polysiloxane or a fluoroalkylpolysiloxane (alkyl has 1 to 5 carbon atoms); a polar group-containing silicone; a fatty acid-modified silicone; and a fluorine-containing silicone.

The other lubricants include an alcohol such as a monohydric, dihydric, trihydric, tetrahydric, pentahydric or hexahydric alcohol having 12 to 22 carbon atoms (which may contain an unsaturated bond or may be branched), an alkoxy alcohol having 12 to 22 carbon atoms (which may contain an unsaturated bond or may be branched) or a fluorine-containing alcohol; a polyolefin such as polyethylene wax or polypropylene; a polyglycol such as ethylene glycol or polyethylene oxide wax; an alkylphosphate and an alkali metal salt thereof; an alkylsulfate and an alkali metal salt thereof; a polyphenyl ether; a fatty acid amide having 8 to 22 carbon atoms; and an aliphatic amine having 8 to 22 carbon atoms.

As the additives showing the antistatic effect, the dispersing effect or the plasticizing effect, there can be used a phenylphosphonic acid, specifically "PPA" manufactured by Nissan Chemical Industries, Ltd., α-naphthylphosphoric acid, phenylphosphoric acid, diphenylphosphoric acid, p-ethyl-benzenephosphonic acid, phenylphosphinic acid, aminoquinones, various kinds of silane coupling agents, titanium coupling agents, fluorine-containing alkylsulfates and alkali metal salts thereof.

As the lubricants used in the invention, the fatty acids and the fatty acid esters are particularly preferred, and specific examples thereof include lubricants described in WO98/35345. In addition to these, different lubricants and additives can be used in combination therewith.

In addition, there can also be used nonionic surfactants such as an alkylene oxide-based compound, a glycerin-based compound, a glycidol-based compound and an alkylphenol—ethylene oxide adduct; cationic surfactants such as a cyclic amine, an ester amide, a quaternary ammonium salt, a hydantoin derivative, a heterocyclic compound, a phosphonium and a sulfonium; anionic surfactants containing acidic groups such as a carboxylic acid group, a sulfonic acid group, a phosphoric acid group, a sulfate group and a phosphate group; and amphoteric surfactants such as an amino acid, an aminosulfonic acid, a sulfate or phosphate of an aminoalcohol, and an alkylbetaine type surfactant. These surfactants are described in detail in *Kaimen Kasseizai Binran* (Handbook of Surfactants) published by Sangyo Tosho Co., Ltd. These lubricants and antistatic agents do not necessarily have a purity of 100%, and may further contain impurities such as isomers, unreacted products, by-products, decomposed products and oxidation products, in addition to the main components. The amount of these impurities is preferably 30% or less, and more preferably 10% or less.

In the present invention, as described in WO/35345, it is preferred to use a monoester in combination with a diester as the fatty acid ester.

The C/Fe peak ratio of a surface of the magnetic layer of the magnetic recording medium, particularly the disc-shaped magnetic recording medium, of the invention measured by the Auger electron spectroscopy is preferably from 5 to 100, and particularly preferably from 5 to 80. The measuring conditions of the Auger electron spectroscopy are as follows:

Apparatus: Model PHI-660 manufactured by Φ Co.
Measuring Conditions:

| | |
|---|---|
| Primary electron beam accelerating voltage: | 3 KV |
| Sample current: | 130 nA |
| Magnification: | 250-fold |
| Inclination angle: | 30° |

The C/Fe peak ratio is determined by integrating the range of kinetic energy of 130 to 730 eV three times under the above-mentioned conditions, finding the strength of a KLL peak of carbon and that of a LMM peak of iron, and taking the ratio of C/Fe.

On the other hand, the amount of the lubricant contained in each of the upper layer and the lower layer of the magnetic recording medium of the invention is preferably from 5 to 30 parts by weight based on 100 parts by weight of each of the ferromagnetic powder and the nonmagnetic inorganic powder.

These lubricants and surfactants used in the invention each have different physical functions, and the kind and amount thereof and the ratio of the lubricant simultaneously used, which exerts an synergistic effect, should be optimally determined depending on the purpose. The following methods are applicable in this regard:

(1) The fatty acids different in melting point are used in the nonmagnetic and magnetic layers, respectively, to control their bleeding to the surface;

(2) The esters different in boiling point or in melting point are used in the nonmagnetic and magnetic layers, respectively, to control their bleeding to the surface;

(3) The amount of the surfactant is adjusted to improve the stability of coating; and (4) The amount of the lubricant added is increased in an intermediate layer to improve a lubricating effect.

Of course, the use of the lubricants and surfactants is not limited to the examples shown above. In general, the total amount of the lubricant is selected within the range of 0.1 to 50% by weight, preferably 2 to 25% by weight, based on the ferromagnetic powder or the nonmagnetic powder.

All or a part of the additives used in the invention may be added in any step of the production of the magnetic coating and the nonmagnetic coating. For example, they can be mixed with the magnetic substance before a kneading step, or can be added in a kneading step of the magnetic substance, the binder and the solvent, in a dispersing step, after the dispersing step or just before coating. Further, all or a part of the additives are applied by the simultaneous or sequential coating after coating of the magnetic layer depending on the purpose, thereby being able to attain the object in some cases. Further, according to the purpose, the surface of the magnetic layer can also be coated with the lubricant after calendering or after the completion of slitting. In the invention, organic solvents known in the art can be used. For example, solvents described in JP-A-6-68453 can be used.

[Layer Constitution]

In the magnetic recording medium of the invention, the thickness of the support is from 2 to 100 μm, and preferably from 2 to 80 μm. As the support for a computer tape, there is used a support having a thickness ranging from 3.0 to 6.5 μm (preferably from 3.0 to 6.0 μm, more preferably from 4.0 to 5.5 μm).

In order to improve adhesion, an undercoat layer may be provided between the support, preferably the nonmagnetic flexible support, and the nonmagnetic layer or the magnetic layer. The thickness of the undercoat layer is from 0.01 to 0.5 μm, and preferably from 0.02 to 0.5 μm.

In order to achieve effects of static prevention and curl correction, a back layer may be provided on the support on the side opposite to the magnetic layer. The thickness thereof is usually from 0.1 to 4 μm, and preferably from 0.3 to 2.0 μm. As the undercoat layer and the back layer, ones known in the art can be used.

The thickness of the magnetic layer of the invention is as described above, and optimized according to the saturation magnetization amount of the head used, the head gap length and the recording signal zone. The lower layer exhibits its effect as long as it is substantially nonmagnetic. Accordingly, for example, a small amount of magnetic powder may be contained as impurities or intentionally. The term "substantially nonmagnetic" as used herein indicates that the residual flux density is 10 mT or less, or the coercive force is 100 Oe (8 kA/m) or less, and preferably that the lower layer has no residual flux density and no coercive force. Further, when the lower layer contains a magnetic powder, the content thereof is preferably less than ½ of the whole inorganic powder contained in the lower layer. Furthermore, a soft magnetic layer containing a soft magnetic powder and a binder may be formed.

[Back Layer]

The magnetic recording medium of the invention can be provided with the back layer. A magnetic disc can also be provided with the back layer. In general, however, a magnetic tape for recording computer data strongly requires repetitive running properties, compared to a video tape and an audio tape. In order to maintain such high running durability, it is preferred that the back layer contains carbon black and an inorganic powder.

Two kinds of carbon blacks different in average particle size are preferably used in combination. In this case, a fine granular carbon black having an average particle size of 10 to 20 nm and a coarse granular carbon black having an average particle size of 230 to 300 nm are preferably used in combination. In general, addition of the fine granular carbon black as described above allows the surface electric resistance and light transmittance of the back layer to be established low. In many magnetic recorders, the light transmittance of a tape is used as an operation signal. In such a case, addition of the fine granular carbon black becomes particularly effective. Further, the fine granular carbon black is generally excellent in holding power of a liquid lubricant, and contributes to a reduction in the coefficient of friction when a lubricant is used in combination therewith. On the other hand, the coarse granular carbon black having an average particle size of 230 to 300 nm has a function as a solid lubricant, and forms fine projections on a surface of the back layer to decrease a contact area, thereby contributing to a reduction in the coefficient of friction.

When commercially available products are used as the fine granular carbon black and the coarse granular carbon black in the invention, specific examples thereof include carbon blacks described in WO98/35345.

When two kinds of carbon blacks different in average particle size are used in the back layer, the content ratio of the fine granular carbon black having an average particle size of 10 to 20 nm to the coarse granular carbon black having an average particle size of 230 to 300 nm is preferably from 98:2 to 75:25, and more preferably from 95:5 to 85:15.

The content of the carbon black in the back layer (when two kinds are used, the total content thereof) is usually from 50 to 200 parts by weight, and preferably from 80 to 120 parts by weight.

As for the inorganic powder, it is preferred to use two kinds of inorganic powders different in hardness.

Specifically, a soft inorganic powder having a Mohs' hardness of 3 to 4.5 and a hard inorganic powder having a Mohs' hardness of 5 to 9 are preferably used.

Addition of the soft inorganic powder having a Mohs' hardness of 3 to 4.5 can stabilize the coefficient of friction in repeated running. Moreover, the inorganic powder having a hardness within this range does not scrape a sliding guide pole. It is preferred that this inorganic powder has an average particle size ranging from 30 to 50 nm.

The soft inorganic powders having a Mohs' hardness of 3 to 4.5 include, for example, calcium sulfate, calcium carbonate, calcium silicate, barium sulfate, magnesium carbonate, zinc carbonate and zinc oxide. They can be used either alone or as a combination of two or more of them.

Addition of the hard inorganic powder having a Mohs' hardness of 5 to 9 enhances the strength of the back layer and improves running durability. When this inorganic powder is used together with the carbon black and the soft inorganic powder, deterioration of the back layer in repeated sliding is reduced to give the strong back layer. Further, addition of this inorganic powder gives proper abrasive power to reduce adhesion of shavings to a tape guide pole. In particular, the combined use thereof with the soft inorganic powder improves sliding characteristics to a guide pole having a rough surface, and can stabilize the coefficient of friction of the back layer.

The average particle size of the hard inorganic powder is preferably within the range of 80 to 250 nm, and more preferably within the range of 100 to 210 nm.

The hard inorganic powders having a Mohs' hardness of 5 to 9 include, for example, α-iron oxide, α-alumina and chromium oxide ($Cr_2O_3$). These powders may be used either alone or in combination. Of these, preferred are α-iron oxide and α-alumina. The content of the hard inorganic powder is preferably from 1 to 30 parts by weight, and more preferably from 5 to 20 parts by weight, based on 100 parts by weight of the carbon black.

When the soft inorganic powder and the hard inorganic powder are used together in the back layer, they are preferably selected so that the difference in hardness between the soft inorganic powder and the hard inorganic powder is 2 or more (more preferably 2.5 or more, particularly 3 or more).

It is preferred that the back layer contains above-mentioned two kinds of inorganic powders each having the specific average particle size and different in Mohs' hardness, and the above-mentioned two kinds of carbon blacks different in average particle size.

The back layer can contain a lubricant. The lubricant can be appropriately selected from the lubricants described above as those for the nonmagnetic layer and the magnetic layer. The lubricant is added to the back layer usually in an amount of 1 to 5 parts by weight based on 100 parts by weight of the binder.

[Support]

The support used in the invention is preferably a nonmagnetic flexible support, and preferably has a heat shrinkage rate of 0.5% or less at 100° C. for 30 minutes in each in-plane direction of the support and a heat shrinkage rate of 0.5% or less, more preferably 0.2% or less, at 80° C. for 30 minutes. Further, the above-mentioned heat shrinkage rates at 100° C. for 30 minutes and at 80° C. for 30 minutes of the support are preferably equal to each other in each in-plane direction of the support with a difference of 10% or less. It is preferred that the support is nonmagnetic. As these supports, there can be used known films of polyesters such as polyethylene terephthalate and polyethylene naphthalate, polyolefins, cellulose triacetate, polycarbonates, aromatic or aliphatic polyamides, polyimides, polyamideimides, polysulfones and polybenzoxazole. High-strength supports such as polyethylene naphthalate and polyamide films are preferably used. In order to change the surface roughness of a magnetic surface from that of a base surface, a lamination type support as shown in JP-A-3-224127 can also be used. These supports may previously be subjected to corona discharge treatment, plasma treatment, easy adhesion treatment, heat treatment and dust removing treatment. It is also possible to use an aluminum or glass base plate as the support of the invention.

In order to attain the object of the invention, it is preferred to use the support having a center plane average surface roughness Ra of usually 8.0 nm or less, preferably 4.0 nm or less, and more preferably 2.0 nm or less, when measured with a TOPO-3D surface roughness meter manufactured by WYKO Co. It is further preferred that the support has not only a small center plane average surface roughness, but also no large projections of 0.5 μm or more. The roughness and shape of a surface of the support are freely controlled by adjusting the size and amount of a filler added thereto as needed. Examples of such fillers include organic powders such as acrylic powders, as well as oxides and carbonates of Ca, Si and Ti. It is preferred that the support has a maximum height Rmax of 1 μm or less, a ten-point average roughness Rz of 0.5 μm or less, a center plane peak height Rp of 0.5 μm or less, a center plane valley depth Rv of 0.5 μm or less, a center plane area factor Sr of 10% to 90% and an average wavelength λa of 5 to 300 μm. In order to obtain desired electromagnetic characteristics and durability, the distribution of surface projections of the support can be arbitrarily controlled with the filler. For example, the distribution of projections having a size of 0.01 to 1 μm can be controlled within the range of 0 to 2000 projections per 0.1 mm$^2$.

The F-5 value of the support used in the invention is preferably from 5 to 50 kg/mm$^2$ (from 49 to 490 MPa). The heat shrinkage rate of the support at 100° C. for 30 minutes is preferably 3% or less, and more preferably 1.5% or less, and the heat shrinkage rate at 80° C. for 30 minutes is preferably 0.5% or less, and more preferably 0.1% or less. The breaking strength is preferably from 5 to 100 kg/mm$^2$ (from 49 to 980 MPa), and the modulus of elasticity is preferably from 100 to 2000 Kg/mm$^2$ (from 0.98 to 19.6 GPa). The coefficient of thermal expansion is from $10^{-4}$ to $10^{-8}$/° C., and preferably from $10^{-5}$ to $10^{-6}$/° C. The coefficient of humidity expansion is $10^{-4}$/RH % or less, and preferably $10^{-5}$/RH % or less. It is preferred that these thermal characteristics, dimensional characteristics and mechanical strength characteristics in each in-plane direction are approximately equal with a difference of 10% or less.

[Production Process]

A process for producing a magnetic coating used in the magnetic recording medium of the invention comprises at least a kneading step, a dispersing step and mixing steps which are provided before and/or after these steps as needed. Each step may be divided into two or more stages. All of the starting materials used in the invention, such as the magnetic powder, the nonmagnetic powder, the binder, the carbon black, the abrasive, the antistatic agent, the lubricant and the solvent, may be added at the start of or in the course of any step. Each of the starting materials may be added in parts over two or more steps. For example, the polyurethane can be incorporated in parts in the kneading step, the dispersing step and the mixing step for adjustment of viscosity after the dispersing step. In order to attain the object of the invention, a production technique known in the art can be used as a part of the process. In the kneading step, a kneader having strong kneading ability such as an open kneader, a continuous kneader, a pressure kneader or an extruder is preferably used. When the kneader is used, the whole binder or a part thereof (preferably, 30% or more of the whole binder) is kneaded with the magnetic material or the non-magnetic powder within the range of 15 to 500 parts based on 100 parts of the magnetic material. Details of such kneading treatment are described in JP-A-1-106338 and JP-A-1-79274. Further, glass beads can be used for dispersing a solution for the magnetic layer and a solution for the non-magnetic layer. However, zirconia beads, titania beads and steel beads, which are high-specific gravity dispersing media, are suitable. These dispersing media are optimized in particle size and filling rate before use, and as a dispersing apparatus, there can be used one known in the art.

When the solution for the magnetic layer is dispersed by use of the zirconia beads, the titania beads or the steel beads, the average particle size of the beads is preferably form 0.1 to 5.0 mm, and more preferably form 0.5 to 3.0 mm. Further, the dispersing time using the beads is from 0.5 to 20 hours, and more preferably from 1.0 to 5.0 hours.

In the invention, the sequential multiple layer coating is used in which the lower layer is formed and dried, and then the magnetic layer is provided thereon. This coating is also preferred in respect to inhibition of interfacial fluctuation.

In order to prevent the electromagnetic characteristics of the magnetic recording medium from deteriorating due to coagulation of the magnetic particles, it is also desirable to give shear to a coating solution in the inside of a coating head by methods as described in JP-A-62-95174 and JP-A-1-236968. Further, it is preferred that the viscosity of a coating solution satisfies the numerical value range disclosed in Japanese Patent Application No. 1-312659.

In the case of the disk, isotropic orientation is sufficiently obtained in some cases, even when orientation is not performed using an orientation apparatus. However, it is desirable to use random orientation apparatus known in the art such as an apparatus in which cobalt magnets are obliquely alternately arranged and an apparatus in which magnetic fields are applied by use of solenoids. The hexagonal ferrite is generally liable to become tree-dimensionally random in a plane and in a perpendicular direction. However, it is also possible to be two-dimensionally random in a plane. Further, isotropic magnetic characteristics can also be imparted in a circumferential direction by perpendicular orientation using known means such as heteropolar opposed magnets. In particular, when high-density recording is carried out, perpendicular orientation is preferred. Circumference orientation may also be conducted using spin coating.

In the case of the magnetic tape, it is longitudinally oriented using cobalt magnets or solenoids. It is preferred that the temperature of drying air, the air flow and the coating speed are controlled, thereby adjusting the drying position of a coating film. The coating speed is preferably from 20 to 1,000 nm/min, and the temperature of drying air is preferably 60° C. or higher. Before the tape enters a magnet zone, proper predrying can also be performed.

The squareness ratio of the magnetic tape is preferably 0.7 or more, and more preferably 0.8 or more, in a longitudinal direction.

After the orientation treatment, the magnetic layer is usually subjected to surface treatment such as calender treatment. As rolls for calender treatment, there are used heat-resistant plastic rolls such as epoxy, polyimide, polyamide and polyimideamide resin rolls, or metal rolls. In particular, when the double-sided magnetic layers are formed, treatment with the metal rolls is preferred. The treating temperature is preferably 50° C. or more, and more preferably 100° C. or more. The line pressure is preferably 200 kg/cm (196 kN/m) or more, and more preferably 300 kg/cm (294 kN/m) or more.

After the calender treatment, the magnetic recording medium is stamped out or cut to a desired form. After it has been stamped out to the disc form as needed, thermo treatment at high temperatures (usually from 50° C. to 90° C.) is conducted to accelerate curing treatment of the coated layer, and burnishing treatment can be conducted with an abrasive tape. Further, in the case of the magnetic tape, a surface of the magnetic layer can be cleaned with a tape cleaning apparatus having a unit for delivering a slit product and a unit for winding up it, to which a nonwoven fabric and a razor blade are attached so as to be pressed against the magnetic surface.

[Physical Characteristics]

The saturation flux density of the magnetic layer of the magnetic recording medium according to the invention is preferably from 100 to 300 mT. The coercive forces Hc and Hr are preferably from 1,800 to 5,000 Oe (144 to 400 kA/m), and more preferably from 1,800 to 3,000 Oe (144 to 240 kA/m). It is preferred that the distribution of the coercive force is narrower, and the SFD (switching field distribution) and the SEDr are preferably 0.6 or less.

The coefficient of friction of the magnetic recording medium of the invention to a head is usually 0.5 or less, and preferably 0.3 or less, at a temperature ranging from $-10°$ C. to $40°$ C. and a humidity ranging from 0% to 95%. The surface specific resistance of the magnetic surface is preferably from $10^4$ to $10^{12}$ ohms/square, and the charge potential is preferably from $-500$ V to $+500$ V. The modulus of elasticity of the magnetic layer at an elongation of 0.5% is preferably from 100 to 2,000 kg/mm$^2$ (from 980 to 19,600 N/mm$^2$), in each in-plane direction, and the breaking strength is preferably from 10 to 70 kg/mm$^2$ (from 98 to 686N/mm$^2$). The modulus of elasticity of the magnetic recording medium is preferably from 100 to 1,500 kg/mm$^2$ (from 980 to 14,700N/mm$^2$), in each in-plane direction, and the residual elongation is preferably 0.5% or less. The heat shrinkage rate at all temperatures of $100°$ C. or less is preferably 1% or less, more preferably 0.5% or less, and still more preferably 0.1% or less. The glass transition temperature (the maximum point of the loss elastic modulus in measurement of the dynamic viscoelasticity at 110 Hz) of the magnetic layer is preferably from $50°$ C. to $120°$ C., and that of the lower layer is preferably from $0°$ C. to $100°$ C. The loss elastic modulus is preferably within the range of $1\times10^3$ to $8\times10^4$ N/cm$^2$, and the loss tangent is preferably 0.2 or less. When the loss tangent is too high, an adhesion failure is liable to occur. It is preferred that these thermal characteristics and mechanical characteristics in respective in-plane directions of the medium are approximately equal with a difference of 10% or less. The content of residual solvents contained in the magnetic layer is preferably 100 mg/m$^2$ or less, and more preferably 10 mg/m$^2$ or less. The percentage of voids of the coated layers is preferably 30% by volume or less, and more preferably 20% by volume or less, in both the upper and lower layers. A lower percentage of voids is preferred for attaining a higher output. However, it is sometimes better to secure a certain value depending on the purpose. For example, in disk media in which importance is given to repetition use, a higher percentage of voids provides better running durability in many cases.

The center plane average surface roughness Ra of the surface of the magnetic layer measured with a TOPO-3D surface roughness meter manufactured by WYKO Co. is 10 nm or less, preferably 5 nm or less, and more preferably 3 nm or less. However, the RMS surface roughness $R_{RMS}$ determined by evaluation under an AFM is preferably within the range of 2 to 15 nm. It is preferred that the magnetic layer has a maximum height Rmax of 0.5 µm or less, a ten-point average roughness Rz of 0.3 µm or less, a center plane height Rp of 0.3 µm or less, a center plane depth Rv of 0.3 µm or less, a center plane area factor Sr of 20% to 80% and an average wavelength λa of 5 to 300 µm. As for the surface projections of the magnetic layer, the projections having a size of 0.01 to 1 µm can be arbitrarily controlled within the range of 0 to 2000 projections per 0.1 mm$^2$, thereby preferably optimizing the electromagnetic characteristics and the coefficient of friction. These can be easily controlled by the control of surface properties of the support, the particle size and amount of the powder added to the magnetic layer and the shape of surfaces of the rolls for calender treatment. The curl is preferably within ±3 mm.

In the magnetic recording medium of the invention, it is easily conceivable to be capable of changing the physical properties in the upper layer and the lower layer depending on the purpose. For example, the modulus of elasticity of the upper layer is raised to improve running properties, and at the same time, the modulus of elasticity of the lower layer is made lower than that of the upper layer to improve the touch of the magnetic recording medium to a head.

In this specification, 10 Oe (oersteds) is converted 0.08 kA/m, although it corresponds to (¼π) kA/m, and 1 kgf is converted to 9.8 N.

EXAMPLES

The invention will be illustrated in greater detail with reference to the following examples, but the invention should not be construed as being limited thereto. Parts are expressed in parts by weight.

Examples 1 to 8 and Comparative Examples 1 to 6

<Preparation of Coatings>

| Coating for Magnetic Layer | |
|---|---|
| Ferromagnetic Powder (see Table 1) | 100 parts |
| Vinyl Chloride Copolymer | 5 parts |
| MR-110 (manufactured by Nippon Zeon Co., Ltd.) | |
| Polyurethane Resin, | 3 parts |
| UR-8200 (manufactured by Toyobo Co., Ltd.) | |
| Polyisocyanate | 5 parts |
| Coronate L | |
| α-Alumina | 10 parts |
| HIT-55 (manufactured by Sumitomo Chemical Co., Ltd.) | |
| Carbon Black | 1 part |
| #55 (manufactured by Asahi Carbon Co., Ltd.) | |
| Phenylphosphonic Acid | 2 parts |
| Butyl Stearate | 1 part |
| Isohexadecyl Stearate | 1 part |
| Stearic Acid | 2 parts |
| Methyl Ethyl Ketone | 125 parts |
| Cyclohexanone | 125 parts |

| Coating for Lower Layer | |
|---|---|
| Nonmagnetic Powder, TiO$_2$, Crystalline Rutile | 80 parts |
| Average primary particle size: 0.035 µm | |
| SBET: 40 m$^2$/g, TiO$_2$ content: 90% or more, | |
| DBP oil absorption: 27 to 38 ml/100 g, | |
| Surface treatment layer: Al$_2$O$_3$, 8% by weight | |
| Carbon Black | Table 1 |
| CONDUCTEX SC-U (manufactured by Columbian Carbon Company) | |
| MR-110 manufactured | 12 parts |
| UR-8200 | 5 parts |
| Polyisocyanate | 15 parts |
| Coronate L | |
| Butyl Stearate | 1 part |
| Butoxyethyl Stearate | 1 part |
| Isohexadecyl Stearate | 1 part |
| Stearic Acid | 1 part |
| Methyl Ethyl Ketone/Cyclohexanone | 250 parts |
| (8/2 Mixed Solvent) | |

For each of the above-mentioned coatings, the respective components were kneaded with a kneader, and then dispersed by using a sand mill. The resulting dispersions were filtered through a filter having an average pore size of 1 μm to prepare coating solutions for forming the magnetic layer and the lower layer, respectively.

The coating solution for the lower layer was applied onto a 7 μm-thick PET support having a center plane average surface roughness of 3 nm so as to form the lower layer having a specified thickness (described in Table 1) after drying, followed by treatment with a seven-step calender at a temperature of 90° C. at a line pressure of 300 Kg/cm (294 kN/m). Then, the coating solution for the magnetic layer was applied onto the lower layer so as to form the magnetic layer (3) Electromagnetic Characteristics Measurements were made by a ½-inch linear system with a head fixed. The head/tape relative speed was 10 m/sec.

Recording was made using an MIG head (gap length: 0.2 μm, track width: 18 μm), and the recording current was set to the optimum recording current of each tape. As a reproducing head, there was used an anisotropic MR head (A-MR) having an element thickness of 25 nm and a shield gap of 0.2 μm.

S/N ratio: A signal having a recording wavelength of 0.2 μm was recorded, and a reproduced signal was subjected to frequency analysis with a spectrum analyzer manufactured by ShibaSoku Co., Ltd. The ratio of an output of a carrier signal (wavelength: 0.2 μm) to an integrated noise of the whole spectral region was taken as C/N.

TABLE 1

| | Ferromagnetic Powder | Particle Size (nm) | Lower Layer Carbon Black Amount (parts) | Specific Surface Ares (m²/g) | Total Pore Volume (ml/g) | Squareness Ratio | Magnetic Layer Thickness (μm) | Lower Layer Thickness (μm) | S/N Ratio (dB) |
|---|---|---|---|---|---|---|---|---|---|
| Example 1 | BaFe | 30 | 20 | 25 | 0.5 | 0.8 | 0.1 | 1.5 | 6 |
| Example 2 | BaFe | 30 | 10 | 0.1 | 0.001 | 0.8 | 0.1 | 1.5 | 4 |
| Example 3 | BaFe | 30 | 80 | 50 | 1 | 0.8 | 0.1 | 1.5 | 5 |
| Example 4 | BaFe | 30 | 20 | 25 | 0.5 | 0.7 | 0.1 | 1.5 | 4 |
| Example 5 | BaFe | 30 | 20 | 26 | 0.6 | 0.8 | 0.3 | 1.5 | 5.5 |
| Example 6 | BaFe | 30 | 20 | 25 | 0.5 | 0.8 | 0.01 | 1.5 | 4 |
| Example 7 | BaFe | 30 | 20 | 25 | 0.5 | 0.8 | 0.1 | 0.5 | 4 |
| Example 8 | MP | 50 | 20 | 25 | 0.5 | 0.8 | 0.1 | 1.5 | 2 |
| Comparative Example 1 | BaFe | 30 | 1 | 0.01 | 0.0001 | 0.8 | 0.1 | 1.5 | 1 |
| Comparative Example 2 | BaFe | 30 | 120 | 100 | 2 | 0.8 | 0.1 | 1.5 | −1 |
| Comparative Example 3 | BaFe | 30 | 20 | 25 | 0.5 | 0.5 | 0.1 | 1.5 | 1 |
| Comparative Example 4 | BaFe | 30 | 20 | 25 | 0.5 | 0.8 | 0.005 | 1.5 | −1 |
| Comparative Example 5 | BaFe | 30 | 20 | 25 | 0.5 | 0.8 | 0.1 | 0.3 | 1 |
| Comparative Example 6 | MP | 50 | 1 | 0.01 | 0.0001 | 0.8 | 0.1 | 1.5 | −4 |
| Comparative Example 7 | BaFe | 30 | 20 | 27 | 0.7 | 0.8 | 0.5 | 1.5 | 0 | having a specified thickness (described in Table 1) after drying, followed by treatment with a seven-step calender at a temperature of 90° C. at a line pressure of 300 Kg/cm (294 kN/m). Thereafter, a back layer was formed thereon so as to give a thickness of 0.5 μm after drying. The resulting product was slit to a width of ½ inch to obtain a magnetic tape.

Each sample obtained above was evaluated by the following methods, and the results thereof are shown in Table 1.

(1) Squareness Ratio

Measurements were made at an Hm of 10 kOe (800 kA/m) with a vibration sample type fluxmeter (manufactured by Toei Industry Co., Ltd.) in parallel with a magnetic face.

(2) Specific Surface Area and Total Pore Volume of Magnetic Recording Medium Itself by Nitrogen Absorption Method Measurements were made by the nitrogen absorption method as described above. The specific surface area and the total pore volume were adjusted by the amount of the carbon black added to the lower layer.

In Table 1, BaFe in the column of "Ferromagnetic Powder" indicates barium ferrite, and MP indicates a ferromagnetic metal powder (Co/Fe: 30 atomic %, Al/Fe: 10 atomic %, Y/Fe: 5 atomic %, axial ratio: 4, crystallite size: 110 angstroms). The column of "Particle Size" shows the average tabular diameter when the ferromagnetic powder is BaFe, and the average major axis length in the case of MP.

The results shown in Table 1 reveal that Examples satisfying the requirements of the invention are excellent in S/N ratio compared to Comparative Examples unsatisfying any one of the requirements of the invention.

The invention provides the magnetic recording medium comprising the support having provided thereon the nonmagnetic layer containing the nonmagnetic powder, and the magnetic layer containing the ferromagnetic powder formed on the nonmagnetic layer after coating and drying thereof, wherein the ferromagnetic layer is the hexagonal ferrite powder having an average tabular diameter of 15 to 40 nm or the ferromagnetic metal powder having an average major axis length of 25 to 100 nm, the thickness of the magnetic layer is from 0.01 to 0.3 μm, the thickness of the nonmagnetic layer is from 0.5 to 5 μm, and the specific surface area and the total pore volume of the magnetic recording medium itself measured by the nitrogen absorption method are from 0.1 to 50 m²/g and from 0.001 to 1 ml/g, respectively, thereby being able to provide the magnetic recording medium for high density recording extremely improved in S/N ratio even when it is used in combination with the MR head.

This application is based on Japanese Patent application JP 2003-127198, filed May 2, 2003, the entire content of which is hereby incorporated by reference, the same as if set forth at length.

What is claimed is:

1. A magnetic recording medium comprising a support having provided thereon a nonmagnetic layer containing a nonmagnetic powder and carbon black, and a magnetic layer containing a ferromagnetic metal powder formed on the nonmagnetic layer after coating and drying thereof, wherein the ferromagnetic metal powder has an average major axis length of 25 to 100 nm, the magnetic layer has a thickness of 0.01 to 0.3 μm, the nonmagnetic layer has a thickness of 0.5 to 5 μm, the carbon black is present in the nonmagnetic layer in an amount of from 5 to 100% by weight, based on the amount of nonmagnetic powder, and the magnetic recording medium has a specific surface area of 0.1 to 50 m²/g and a total pore volume of 0.001 to 1 ml/g, the specific surface area and the total pore volume being measured by a nitrogen absorption method.

2. The magnetic recording medium according to claim 1, which is a magnetic tape having a squareness ratio of 0.7 or more.

3. The magnetic recording medium according to claim 1, which is capable of being reproduced with Magneto Resistive (MR) Head.

4. A magnetic recording medium obtained by a process comprising the steps of:

coating a nonmagnetic layer containing a nonmagnetic powder and carbon black on a support;

drying the nonmagnetic layer to form a dried nonmagnetic layer; and coating a magnetic layer containing a ferromagnetic metal powder on the dried nonmagnetic layer;

wherein the ferromagnetic metal powder has an average major axis length of 25 to 100 nm, the magnetic layer has a thickness of 0.01 to 0.3 μm, the nonmagnetic layer has a thickness of 0.5 to 5 μm, the carbon black is present in the nonmagnetic layer in an amount of from 5 to 100% by weight, based on the amount of nonmagnetic powder, and the magnetic recording medium has a specific surface area of 0.1 to 50 m²/g and a total pore volume of 0.001 to 1 ml/g, the specific surface area and the total pore volume being measured by a nitrogen absorption method.

5. A method for producing a magnetic recording medium comprising:

coating a nonmagnetic layer containing a nonmagnetic powder and carbon black on a support;

drying the nonmagnetic layer to form a dried nonmagnetic layer; and coating a magnetic layer containing a ferromagnetic metal powder on the dried nonmagnetic layer;

wherein the ferromagnetic metal powder has an average major axis length of 25 to 100 nm, the magnetic layer has a thickness of 0.01 to 0.3 μm, the nonmagnetic layer has a thickness of 0.5 to 5 μm, the carbon black is present in the nonmagnetic layer in an amount of from 5 to 100% by weight, based on the amount of nonmagnetic powder, and the magnetic recording medium has a specific surface area of 0.1 to 50 m²/g and a total pore volume of 0.001 to 1 ml/g, the specific surface area and the total pore volume being measured by a nitrogen absorption method.

* * * * *